| United States Patent [19] | [11] Patent Number: 4,588,650 |
| Mientus et al. | [45] Date of Patent: May 13, 1986 |

[54] OLEFIN POLYMER STRETCH/CLING FILM

[75] Inventors: Bernard S. Mientus, Newark; William G. Fields, Heath; Marlin G. Bussey, Thornville, all of Ohio

[73] Assignee: The Dow Chemical Company, Midland, Mich.

[21] Appl. No.: 687,689

[22] Filed: Dec. 31, 1984

Related U.S. Application Data

[62] Division of Ser. No. 427,231, Sep. 29, 1982.

[51] Int. Cl.$^4$ .................. C08L 23/18; B32B 27/32; B32B 27/18
[52] U.S. Cl. .................. 428/516; 525/240; 525/210
[58] Field of Search .................. 525/240; 428/516

[56] References Cited

U.S. PATENT DOCUMENTS

| 4,087,505 | 5/1978 | Sugimoto et al. | 264/95 |
| 4,170,309 | 10/1979 | Huke | 206/597 |
| 4,205,021 | 5/1980 | Morita et al. | 525/240 |
| 4,243,619 | 1/1981 | Fraser et al. | 264/40.6 |

OTHER PUBLICATIONS

Package Engineering-New Polyethylenes-Feb. 1980, pp. 39-40.

*Primary Examiner*—Carman J. Seccuro

[57] ABSTRACT

Olefin polymer films composed essentially of a copolymer of a major proportion of ethylene with a minor proportion of a higher α-olefin monomer and an effective amount of a tackifying agent are provided which have unusually high Elmendorf tear strength in the machine direction, a good balance of machine direction to transverse direction Elmendorf tear strengths, and excellent cling properties. Such films are exceptionally well suited for use as a stretch/cling film in various packaging and palletizing applications.

10 Claims, No Drawings

OLEFIN POLYMER STRETCH/CLING FILM

This is a divisional of application Ser. No. 427,231, filed Sept. 29, 1982.

BACKGROUND OF THE INVENTION

In one aspect, the present invention relates to olefin polymer films and, in particular, to olefin polymer films having a combination of physical properties making them especially well suited for use as stretch/cling films in various packaging and/or palletizing applications. In another aspect, the present invention relates to biaxially oriented films of ethylene/higher α-olefin copolymers having a tackifying agent incorporated therein.

In the packaging and/or palletizing art, it is known to package individual articles and/or to bundle together or palletize a plurality of articles using a so-called "stretch wrapping" technique. According to such technique, a relatively thin film web of a polymeric material is stretched or elongated, thereby creating tension in said film web, while being wrapped several times around the article or articles to be packaged or palletized. Upon the release of the stretching or elongating forces at the conclusion of the wrapping operation, the film attempts to relax or spring at least partially back to its original non-stretched dimension thereby tightly or snuggly engaging the article or articles wrapped therein. In connection with such a stretch wrapping operation, it is possible in theory to secure the stretched and wrapped film in place around the packaged article or articles in a variety of ways (i.e., so as to prevent the stressed or tensioned film from returning or relaxing back to its original dimensions without imparting the desired packaging integrity to the packaged article or articles encompassed thereby). However, as a matter of practical expediency, efficiency and economy, it is common practice to employ film which exhibits sufficient cling to itself to hold said film in place around the packaged article, to prevent significant slippage of the stretched overlaid film layers, and to thereby prevent relaxation or shrinkage of said film back to its original pre-packaging unstretched dimensions.

While a variety of films are currently available on the commercial market for use in stretch/cling packaging or palletizing operations, such currently available films all suffer from one or more notable deficiencies, drawbacks, or limitations. For example, some of the films which are currently available are produced via cast film processes. While such cast films are typically characterized by having high Elmendorf tear ratings in the transverse direction, they also generally have relatively low tear resistance in the machine direction. As such, these cast films have a pronounced tendency to tear on the corners or at other sharp protrusions of articles being stretch wrapped or palletized therewith. On the other hand, certain other currently available stretch/cling films, such as those produced by conventional blown film processing techniques, generally have a more acceptable balance between their Elmendorf tear ratings in the machine and transverse directions, but are generally less than totally satisfactory in terms of certain other properties such as, for example, their cling properties, particularly at high degrees of elongation.

In view of the foregoing deficiencies of the stretch/cling films available to date, it would be highly desirable to provide a polymeric film having the proper combination of properties to overcome said deficiencies and to thereby be especially well suited for use as a stretch/cling film for packaging and palletizing end-use applications.

SUMMARY OF THE INVENTION

In accordance with the present invention, such an improved stretch/cling film is provided in the form of an olefin polymer film having (a) an Elmendorf tear rating in the machine direction of at least about 250 g/mil; (b) a machine direction:transverse direction (MD:TD) Elmendorf tear ratio of at least about 0.5; and (c) a cling value of at least about 10 grams per five (5) inches of sample width. Such improved films are composed of an olefin polymer composition consisting essentially of (a) an ethylenic copolymer comprising a major proportion of ethylene and a minor proportion of a higher α-olefin monomer (i.e., containing 6 or more carbon atoms) and (b) an effective amount of a tackifying agent and are especially well suited for use in the stretch wrapping bundling of articles having sharp edges or corners, or other sharp protrusions, associated therewith.

The stretch/cling films of the present invention are particularly notable and beneficial in the sense that they embody an overall combination of properties which has not heretofore been available with prior art stretch/cling films. For example, the machine direction Elmendorf tear strengths and the MD:TD Elmendorf tear strength ratios of the subject stretch/cling films surpass those of conventional stretch/cling films made by known cast film processes. On the other hand, the subject stretch/cling films also exhibit better surface smoothness and cling properties than has heretofore been achievable using internal tackifying agents in conjunction with conventional blown film manufacturing techniques.

DETAILED DESCRIPTION OF THE INVENTION

The olefin polymer resins employed to make the stretch/cling films of the present invention are those ethylenic copolymers which comprise a major proportion by weight of ethylene copolymerized with a minor proportion by weight of a higher α-olefin monomer containing 6 or more carbon atoms. Such ethylenic copolymers are commonly referred to in the art as linear low density polyethylenes (LLDPE). Preferably the ethylenic copolymers employed are those having from about 2 to about 10 weight percent of said higher α-olefin monomer copolymerized therein. In addition, it is also preferable that the higher α-olefin monomer employed in said ethylenic copolymer be a $C_6$ to $C_{12}$ α-olefin such as, for example, 1-hexene, 1-heptene, 1-octene, 1-nonylene, 1-decene, etc., and in particular, 1-hexene, 1-heptene or 1-octene.

While it is not especially critical, the aforementioned ethylenic copolymers employed in the practice of the present invention will typically have a melt index, as determined pursuant to ASTM-D-1238, Condition E, of from about 1 to about 10 (preferably from about 1 to about 5) decigrams/minute and a density in the range of from about 0.915 to about 0.930 (preferably from about 0.915 to about 0.925) g/cc.

As has been previously alluded to, a particularly beneficial feature of the stretch/cling films of the present invention is that they possess relatively high Elmendorf tear strength in the machine direction as evidenced, for example, by machine direction (MD) Elmendorf tear strength values of at least about 250 g/mil (preferably at least about 300 g/mil) and by machine direction (MD) to transverse direction (TD) Elmendorf tear strength ratios of at least about 0.5 (preferably at least about 0.6). With regard to such features, experimental work conducted in connection with the present invention has revealed that the machine direction Elmendorf tear strength and MD:TD Elmendorf tear strength ratio of the subject stretch/cling films are notably reduced when said films are prepared from blends of the above-described ethylenic copolymers containing as little as 5 weight percent (total polymer weight basis) of conventional low density polyethylene homopolymers admixed therein. Accordingly, it is believed to be an important aspect of the present invention that the polymer composition employed to prepare the subject stretch/cling films consists essentially of the above-defined ethylenic copolymers and an effective amount of a suitable tackifying agent.

Tackifying agents suitably employed herein are materials which when blended with the above-described ethylenic copolymers are capable of imparting increased tackiness or cling to at least one surface of a film prepared therefrom. By the phrase "increased tackiness or cling" it is meant that at least one major surface of a film prepared from a polymer composition comprising the above-described ethylenic copolymer and the tackifying agent has a measurably higher cling than either major surface of a film prepared from a polymer composition which is identical thereto except for having none of the tackifying agent incorporated therein. Representative materials useful as tackifying agents herein include hydrocarbon resins such as terpene resins, hydrogenated resins and resin esters, isotactic and atactic polypropylenes, polybutenes and the like. Of particular interest in the practice of the present invention are atactic polypropylene and the polybutenes, particularly polymers of isobutylene. The isobutylene polymers preferably employed have a relatively low molecular weight, i.e., a number average molecular weight less than about 3000, more preferably from about 500 to about 2500, wherein molecular weight is determined by gel permeation chromatography. Alternatively, the preferred atactic polypropylenes have a number average molecular weight of up to about 5000, more preferably from about 2000 to about 4000. Most preferably, the tackifying agent is polyisobutylene having a number average molecular weight from about 500 to about 2000.

In the practice of the present invention, the aforementioned tackifying agents are employed in an amount sufficient to provide at least one major surface of the subject polymer films with an initial, as made cling value of at least about 10 grams per 5 inches of sample width (preferably at least about 15 grams per 5 inches of sample width) when measured according to the Cling Test Method described in conjunction with Example 1 of the hereinafter presented working examples. Preferably, said tackifying agents are employed in an amount such that the resulting stretch/cling film retains the ability to cling to itself even when stretched in the machine direction to an elongation of 150 percent (most preferably even at an elongation of 200 percent) in the machine direction when used in conventional stretch/cling packaging or palletizing operations.

In actual practice, the amount of tackifying agent to be employed in the subject stretch/cling films and in order to accomplish one or more of the foregoing objectives will depend in large part upon the particular tackifying agent chosen for utilization therein, upon the manner in which said tackifying agent is distributed within or throughout said film, upon the surface characteristics (i.e., smoothness) exhibited by the polymer film concerned and upon the ultimate end-use application for which said film is intended. Thus, of example, in the case of films intended for stretch/cling wrap applications involving use at relatively low levels of elongation (e.g., meat wrap applications and the like), relatively lower levels of tackifying agent (e.g., as little as about 1 weight percent tackifying agent on a total film weight basis and based upon a homogeneously blended single layer film type structure) can typically be employed with suitable results. On the other hand, in the case of films intended for use at relatively high levels of elongation (e.g., in palletizing, bundling etc. operations) the utilization of tackifying agent at relatively higher levels (e.g., on the order of at least about 3 weight percent on a total film weight basis and based upon a homogeneously blended single layer film structure) is typically required.

Naturally, since cling properties are predominantly a surface related phenomenon in films of the type involved herein, it will be recognized by those skilled in the art that the minimum required amount of tackifying agent usage can be reduced or minimized somewhat (i.e., in terms of the minimum weight percentage employed on a total film weight basis) by resort to an intentional non-homogeneous distribution of said tackifying agent within said film structure such as, for example, by utilization of known coextrusion techniques to concentrate said tackifying agent in a layer at one or both major surfaces of said film structure while keeping either one side, or a central core layer thereof substantially free of said tackifying agent. Thus, for example, in one preferred embodiment of the present invention the subject stretch/cling film is a multi-layer structure in which (A) a first ethylene/higher α-olefin copolymer layer (a) constitutes at least about 50 percent (preferably at least about 70 percent) of the total film thickness and (b) has no significant quantity of tackifying agent incorporated therein and in which (B) at least one ethylene/higher α-olefin copolymer surface layer has an effective amount (e.g., from about 1.5 to about 10, preferably from about 3 to about 8, weight percent based upon the weight of said surface layer) of the tackifying agent incorporated therein.

In another preferred embodiment, the foregoing multilayered structure is one in which said first tackifier free layer is a centrally located core layer which is sandwiched in between two tackifier containing surface layers.

Within the context of the foregoing film structure and end-use related variables, it can be said, however, that as a general rule the aforementioned tackifying agent will typically be employed in an amount ranging from about 0.5 to about 10 (preferably from about 1 to about 8) weight percent based upon the total weight of the subject polymer films.

An additional feature of some significance relative to the stretch/cling films of the present invention (and, in particular, relative to the requisite cling properties thereof) is that said films have relatively smooth surfaces. For the purposes of the present invention, adequate surface smoothness will preferably be evidenced by the film having 60° gloss of at least about 110 as measured using a Gardner Glossmeter in the conventional fashion. Most preferably, the films of the present invention will exhibit a 60° gloss rating of at least about 120 as measured using said Gardner Glossmeter.

The thickness of the stretch/cling films of the present invention is not particularly critical. However, as a general rule the thickness thereof will typically be in the range of from about 0.5 to about 2 mils and will preferably be in the range of from about 0.7 to about 1 mil.

In the preparation of the stretch/cling films of the present invention, it is believed to be important that said films be biaxially oriented in order that they possess the requisite MD tear strength and MD:TD tear strength ratio as set forth above. In addition, it is also believed to be important (for example, from the standpoint of surface smoothness and requisite cling at tolerable tackifying agent loadings) that said films be quenched fairly rapidly following the extrusion thereof such as, for example, at a quench rate more characteristic of that of a conventional cast film process as opposed to the generally slower quench rate typically provided by conventional blown film manufacturing techniques.

While the foregoing combination of processing features may be suitably obtainable for the purposes of the present invention in a variety of known fashions (e.g., conventional cast film extrusion for rapid quench coupled with known tentering techniques for biaxial orientation and/or conventional blown film extrusion for biaxial orientation coupled with a subsequent water quench for rapid cooling), it has been found to be advantageous, and is preferred, for the purposes of the present invention to prepare the subject stretch/cling films using the film extrusion process and apparatus described and claimed in U.S. Pat. Nos. 3,976,733 and 4,025,253. The teachings of these patents relating to such process and apparatus are hereby incorporated by reference thereto.

As has been indicated hereinabove, the stretch/cling films of this invention are particularly well suited for use in stretch/cling packaging and/or palletizing applications which are well known in the art. Accordingly, the utilization of such films in said packaging and/or palletizing operations is generally pursuant to methodology and techniques which are well known to those skilled in the stretch/cling packaging and palletizing art. Similarly, the stretch/cling films of the present invention can also contain known additives which are commonly employed in conventional stretch/cling film compositions such as, for example, pigments, dyes, opacifiers, antioxidants, U.V. stabilizers, and the like.

The present invention is further illustrated by reference to, but is not to be interpreted as being limited by, the following examples thereof in which all parts and percentages are on a weight basis unless otherwise indicated.

EXAMPLE 1

A two-layer film having a total thickness of 0.8 mil was prepared using the film extrusion process described in U.S. Pat. Nos. 3,976,733 and 4,025,253 at a blow-up ratio of 2.5:1 and a quench temperature of 86° F. The primary layer of said film constituted 70 percent of the total film thickness and was composed of an ethylene/octene copolymer having a melt index of 2.3 decigram/min and a density of 0.917 g/cc and which is marketed by The Dow Chemical Company as Dowlex* 2047 brand linear low density polyethylene (LLDPE). The remaining layer of said film, constituting 30 percent of the total film thickness, was composed of a blend containing 95 weight percent, based on blend weight, of Dowlex* 2047 brand LLDPE and 5 weight percent, based on blend weight, of polyisobutylene as a tackifying agent.

*Trademark of The Dow Chemical Company

The properties of the resulting film product are summarized in Table I below. Also presented in Table I for comparative purposes are the corresponding properties of a commercially available stretch/cling film marketed as Mobilrap ® X by Mobil Chemical Corporation.

TABLE I

| Film Properties | Film of Example 1 | Commercially Available Comparison Film* |
|---|---|---|
| 1 Elmendorf Tear (g/mil) | | |
| Machine Direction | 478 | 78 |
| Transverse Direction | 625 | 744 |
| 2 60° Gloss | 140 | 125 |
| 3 Cling gr/5 in** | 24 | 5 |
| 4 Shrink (negative value denotes shrink; positive value denotes elongation) | | |
| Machine Direction | −63.2 | −85.4 |
| Transverse Direction | +9.2 | +51.3 |
| 5 Yield Tensile (psi) | | |
| Machine Direction | 1311 | 2245 |
| Transverse Direction | 1046 | 1039 |
| 6 Ultimate Tensile (psi) | | |
| Machine Direction | 4319 | 6297 |
| Transverse Direction | 3694 | 3900 |
| 7 Ultimate Elongation (%) | | |
| Machine Direction | 650 | 500 |
| Transverse Direction | 743 | 900 |

*Not an example of the invention.
**The reported cling value is the average force in grams required to peel apart or separate two 5 inch wide by 9 inch long film samples which have been freshly stuck together, extruded tube outside surface to extruded tube inside surface, under the gravimetric pressure or force applied by rolling a cylindrical metal roller having a weight of 1 pound, a length of at least 5 inches and diameter of 3/16 inches a single pass over the entire width of said film samples (i.e., in a fashion such that the entire weight of said roller is supported by and uniformly distributed over the entire 5 inch width of said film sample as said roller passes thereover) and at least over that portion of the film sample length over which the average separation force is to be measured. In taking such cling value measurement, the peeling apart of the two film specimens is conducted at a constant peeling speed of 9 inches/minute and a constant peel angle of 60°, said angle being measured between the top surface of the already peeled off portion of the top film sample layer and the top surface of the adjacent, yet to be peeled off portion of said top film sample layer.

Utilizing each of the foregoing films, stretch wrapping evaluations were conducted on commercial scale stretch wrapping equipment having a pre-stretch system. The test pallet employed in such evaluation was a plywood box having a height of 72 inches, a width of 48 inches and a depth of 48 inches, said box being positioned on a typical wooden pallet. The evaluation consisted of determining the minimum film weight required for wrapping the box, defining the elongation at which the film's cling became inadequate, and defining the elongation at which the film could no longer maintain its integrity around the sharp corners and edges at the top of the box. The results of these tests are summarized in Table II below.

TABLE II

| Film Properties | Film of Example 1 | Commercially Available Comparison Film |
|---|---|---|
| 1 Minimum Weight (oz) | 4.0 | 5.8 |
| 2 Cling Elongation Limit (%) | 240 | 100 |
| 3 Corner Test | | |
| Maximum % Elongation | 160 | 95 |
| Film Weight on Wrapped | 7 | 8.3 |

TABLE II-continued

| Film Properties | Film of Example 1 | Commercially Available Comparison Film |
|---|---|---|
| Pallet (oz) | | |

As can be seen from the results presented in Tables I and II, the film of Example 1 is clearly superior to the commercially available comparison film in terms of its (a) machine direction Elmendorf tear strength; (b) machine direction:transverse direction Elmendorf tear strength ratio; (c) its initial cling strength and (d) its maximum elongation limit based both upon loss of cling properties and upon corner puncture criterion.

COMPARATIVE EXPERIMENT

Following the procedures of Example 1, a film sample like that of Example 1 was prepared except that the ethylene/octene copolymer component of Example 1 was replaced in both film layers with a blend composed of 95 weight percent of that same ethylene/octene copolymer and 5 weight percent of a conventional low density polyethylene homopolymer having a density of 0.922 g/cc and a melt index 1.15 decigrams/minute. The resulting film specimen had a machine direction Elmendorf tear strength of 117 g/mil and a machine direction: transverse direction Elmendorf tear strength ratio of 0.176. Thus, the results of this comparative experiment clearly illustrate the importance of ensuring that the ethylenic polymer component employed in the present invention consists essentially of an ethylene/-higher α-olefin polymer as indicated hereinabove.

While the present invention has been hereindescribed and illustrated by reference to certain specific embodiments and examples thereof, such fact is not to be understood as limiting the scope of the presently claimed invention.

What is claimed is:

1. A stretch/cling film which is biaxially oriented and rapidly quenched following the extrusion thereof comprising:
    (a) a first polymer layer, having a thickness at least about 50 percent of the total stretch/cling film thickness, the polymer layer consisting essentially of
        (i) an ethylenic copolymer having, in polymerized form, a major proportion of ethylene and a minor proportion of a higher α-olefin monomer containing 6 or more carbon atoms, a melt index of from about 1 to about 10 decigrams/minute, a density of from about 0.915 to about 0.930 grams/cubic centimeter and no significant quantity of a tackifying agent;
    (b) at least one surface layer, the surface layer consisting essentially of:
        (i) an ethylenic copolymer having, in polymerized form, a major proportion of ethylene and a minor proportion of a higher α-olefin monomer containing 6 or more carbon atoms, a melt index of from about 1 to about 10 decigrams/minute, a density of from about 0.915 to about 0.930 grams/cubic centimeter, and
        (ii) from about 1.5 to about 10 weight percent of a tackifying agent, based on the surface layer weight, the tackifying agent selected from the group of tackifying agents consisting of:
            (1) terpene resins,
            (2) isotactic and atactic polypropylenes, and
            (3) polybutenes;
    (c) an Elmendorf tear rating in the machine direction of at least about 250 grams/mil;
    (d) a machine direction: transverse direction Elmendorf tear ratio of at least 0.5; and
    (e) a cling value of at least about 10 grams per 5 inches of sample width.

2. The stretch/cling film of claim 1 which is further characterized by retaining the ability to cling to itself even when stretched to an elongation of 150 percent in the machine direction.

3. The stretch/cling film of claim 1 which is further characterized by retaining the ability to cling to itself even when stretched to an elongation of 200 percent in the machine direction.

4. The stretch/cling film of claim 1 which has a machine direction:transverse direction Elmendorf tear ratio of at least about 0.6.

5. The stretch/cling film of claim 1 wherein the polybutene tackifying agent is polyisobutylene.

6. The stretch/cling film of claim 1 wherein the higher α-olefin monomer of the ethylenic copolymer is a $C_6$ to $C_{12}$ α-olefin.

7. The stretch/cling film of claim 1 wherein the higher α-olefin monomer of the ethylenic copolymer is 1-octene.

8. The stretch/cling film of claim 1 wherein the higher α-olefin monomer component constitutes from about 2 to about 10 weight percent of said ethylenic copolymer.

9. The stretch/cling film of claim 1 which comprises two surface layers sandwiching the first polymer layer.

10. The stretch/cling film of claim 1 wherein said tackifying agent constitutes from about 3 to about 8 percent of the weight of said surface layer.

* * * * *